United States Patent
Yokota

(12)
(10) Patent No.: US 6,326,745 B1
(45) Date of Patent: Dec. 4, 2001

(54) CATHODE-RAY TUBE APPARATUS

(75) Inventor: Masahiro Yokota, Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/537,752

(22) Filed: Mar. 30, 2000

(30) Foreign Application Priority Data

Mar. 31, 1999 (JP) .................................................. 11-092729

(51) Int. Cl.[7] ...................................................... H01J 29/70
(52) U.S. Cl. ............................................ 315/400; 315/371
(58) Field of Search ...................................... 315/370, 371, 315/364, 368.25, 368.27, 368.28, 382.1, 399, 400; 348/805, 806

(56) References Cited

U.S. PATENT DOCUMENTS

| 5,260,627 | * | 11/1993 | Yokota et al. | ........................ | 315/400 |
| 5,473,299 | * | 12/1995 | Tsutsumi et al. | .................... | 336/110 |
| 5,804,928 | * | 9/1998 | Endo | ..................... | 315/400 |
| 5,883,559 | * | 3/1999 | Chan | ..................... | 336/178 |
| 6,046,538 | * | 4/2000 | Hishiki et al. | ........................ | 313/440 |
| 6,114,934 | * | 9/2000 | Ikeda et al. | .......................... | 336/100 |
| 6,201,360 | * | 3/2001 | Misonou | ............................. | 315/400 |

FOREIGN PATENT DOCUMENTS

| 52-33449 | 8/1977 | (JP) . |
| 1-26146 | 5/1989 | (JP) . |
| 4-312749 | 11/1992 | (JP) . |
| 5-260493 | 10/1993 | (JP) . |
| 6-333512 | 12/1994 | (JP) . |
| 52-33451 | 8/1997 | (JP) . |

* cited by examiner

Primary Examiner—Haissa Philogene
Assistant Examiner—Shih-Chao Chen
(74) Attorney, Agent, or Firm—Pillsbury Winthrop LLP

(57) ABSTRACT

In a cathode-ray tube including a modulator, the modulator has different settings in the intermediate portion and in the peripheral portions of the picture so that the change of inductance along the horizontal axis on the phosphor screen or the change of inductance along the vertical axis on the phosphor screen compensates the difference of distortion between the intermediate portion and the peripheral portions of the picture.

20 Claims, 10 Drawing Sheets

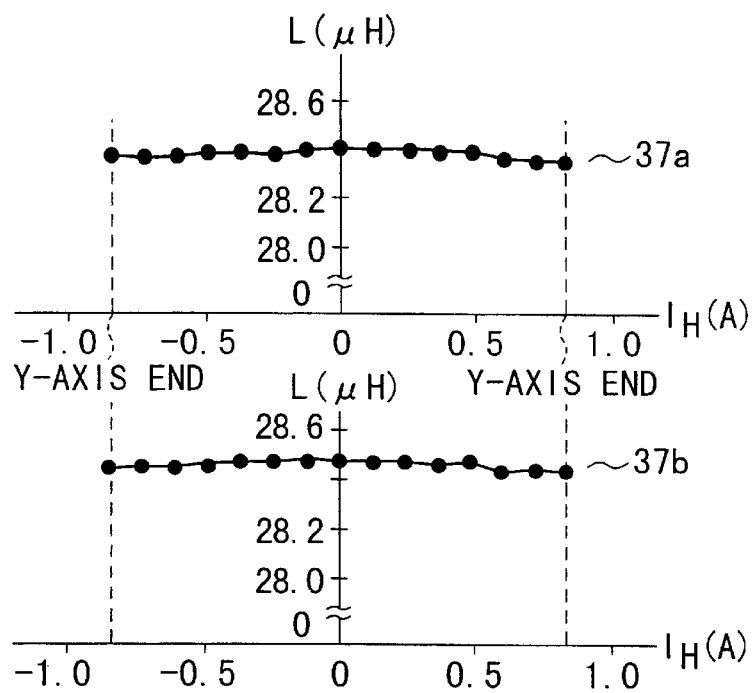
FIG. 13A
FIG. 13B
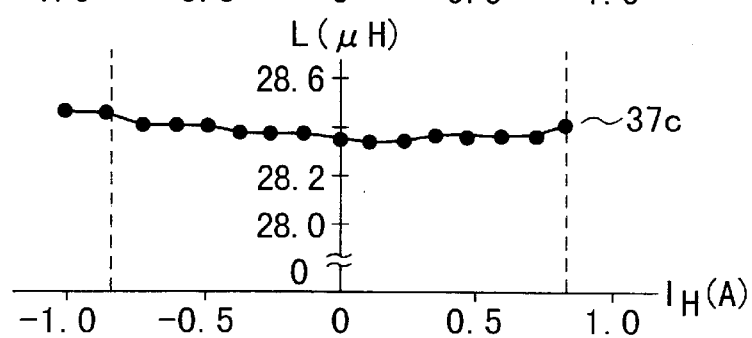
FIG. 13C
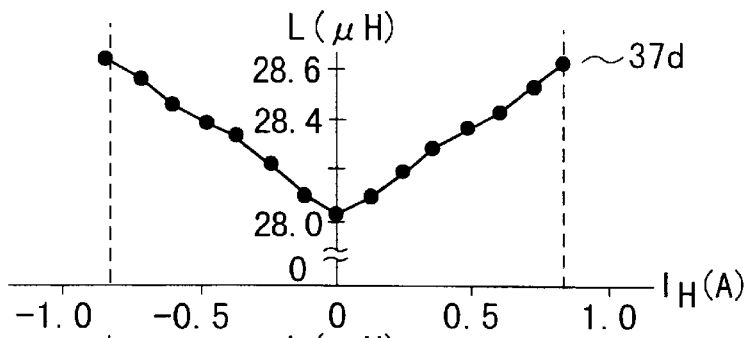
FIG. 13D
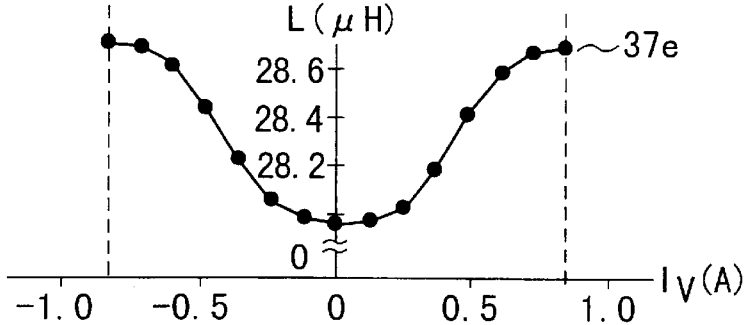
FIG. 13E

CATHODE-RAY TUBE APPARATUS

CROSS-REFERENCE TO RELATED APPLICATIONS

This application is based upon and claims the benefit of priority from the prior Japanese Patent Application No. 11-092729, filed Mar. 31, 1999, the entire contents of which are incorporated herein by reference.

BACKGROUND OF THE INVENTION

The present invention relates to a cathode-ray tube apparatus for displaying color pictures or monochrome pictures by deflecting a plurality of electron beams or a single electron beam emitted from an electron gun by means of a deflecting yoke, and more particularly to a cathode-ray tube apparatus compensating the difference of distortion between the intermediate portion and the peripheral portions of the display screen.

Generally, the color cathode-ray tube apparatus comprises a vacuum envelope having a substantially rectangular panel on whose inner surface a phosphor screen is formed, a funnel, and a cylindrical neck, and it displays color pictures by deflecting a plurality of electron beams emitted from an electron gun arranged in the neck by means of a deflecting yoke disposed from the outer surface of the reduced-diameter portion of the funnel to the neck, and by scanning the phosphor screen through a shadow mask horizontally and vertically. Further, in the monochrome cathode-ray tube apparatus, the electron gun emits a single electron beam, and the shadow mask of the color cathode-ray tube apparatus is omitted therefrom.

In such a cathode-ray tube apparatus, the traveling length of the electron beams deflected to the diagonal ends of the phosphor screen is the longest, and they pass the nearest position from the deflecting coils of the deflecting yoke. Thus, the raster which should be essentially rectangular is distorted to a pin cushion shape. Usually, in order to correct this distortion, magnets having a polarity of assisting a vertical deflection are disposed on and under the opening of the phosphor screen side of the deflecting yoke, and compensates the distortion on the upper and lower ends of the raster (hereinafter, the distortion is called as North-South distortion, i.e., NS distortion). Further, the distortion on the left and right ends of the raster (hereinafter, the distortion is called as East-West distortion, i.e., EW distortion) is compensated by changing the horizontal deflecting voltage dynamically.

However, since the correction of distortion by means of magnets is weaker in the vertically intermediate portion compared with the upper and lower peripheral portions of the picture, there is a distortion called "Inner Kissen Distortion" in the intermediate portion. As a result, there is a difference of distortion between the vertically intermediate portion and the peripheral portion of the picture.

This difference of distortion has been noticeable in recent wide deflection angle color cathode-ray tube apparatus and color cathode-ray tube apparatus having a flat screen.

BRIEF SUMMARY OF THE INVENTION

The present invention has been contrived in consideration of the above circumstances, and its object is to provide a cathode-ray tube apparatus capable of compensating the difference of distortion between the intermediate portion and the peripheral portions of the screen.

In order to attain the above-described object, a cathode-ray tube apparatus according to the present invention comprises a vacuum envelope including a substantially rectangular panel having a phosphor screen on an inner surface thereof and also having a horizontal and a vertical axis, a funnel fixed to the panel and a neck connected to the reduced-diameter portion of the funnel; an electron gun arranged in the neck, for emitting electron beams towards the phosphor screen; a deflecting yoke mounted on a reduced-diameter portion of the funnel and on the circumference of the neck, for deflecting the electron beams so that the phosphor screen is scanned in the horizontal and vertical directions, the deflecting yoke having horizontal deflecting coils for deflecting the electron beams in the horizontal direction, and vertical deflecting coils for deflecting the electron beams in the vertical direction; and a modulator having saturated coils connected to the horizontal deflecting coils, a saturating control coils connected to the vertical deflecting coils, saturable cores around which the saturated or saturating control coils are wound, and magnets biasing the saturable cores magnetically, wherein the modulator has different settings in an intermediate portion and in peripheral portions of a picture formed on the phosphor screen so that the change of inductance the saturating control coils in the horizontal axis direction or the change of inductance of the saturated coils in the vertical axis direction compensates the difference of NS distortion between the intermediate portion and the peripheral portions of the picture with respect to the vertical axis direction or compensates the difference of EW distortion between the intermediate portion and the peripheral portions of the picture with respect to the horizontal axis direction.

Further, another cathode-ray tube apparatus according to the present invention comprises a vacuum envelope including a substantially rectangular panel having a phosphor screen on an inner surface thereof and also having a horizontal and a vertical axis, a funnel fixed to the panel and a neck connected to the reduced-diameter portion of the funnel; an electron gun arranged in the neck, for emitting electron beams towards the phosphor screen; a deflecting yoke mounted on a reduced-diameter portion of the funnel and on the circumference of the neck, for deflecting the electron beams so that the phosphor screen is scanned in the horizontal and vertical directions, the deflecting yoke having horizontal deflecting coils for deflecting the electron beams in the horizontal direction, and vertical deflecting coils for deflecting the electron beams in the vertical direction; and a distortion compensating element having horizontal auxiliary coils connected to the horizontal deflecting coils, vertical auxiliary coils connected to the vertical deflecting coils, saturable cores around which the horizontal or vertical auxiliary coils are wound, and magnets biasing the saturable cores magnetically, wherein the distortion compensating element has different settings in an intermediate portion and in peripheral portion of a picture formed on the phosphor screen so that the change of inductance of the horizontal auxiliary coils in the horizontal axis direction or the change of inductance of the vertical auxiliary coils in the vertical axis direction on the phosphor screen compensates the difference of NS distortion between the intermediate portion and the peripheral portions of the picture with respect to the vertical axis direction or compensates the difference of EW distortion between the intermediate portion and the peripheral portions of the picture with respect to the horizontal axis direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 13A to 13E are graphs showing the change of inductance in the horizontal deflecting circuit along the horizontal axis across the picture in case of disposing the modulator shown in FIG. 10 respectively;

DETAILED DESCRIPTION OF THE INVENTION

Now, an in-line type color cathode-ray tube apparatus according to an embodiment of the present invention will be described in detail with reference to the accompanying drawing.

Figure 1:
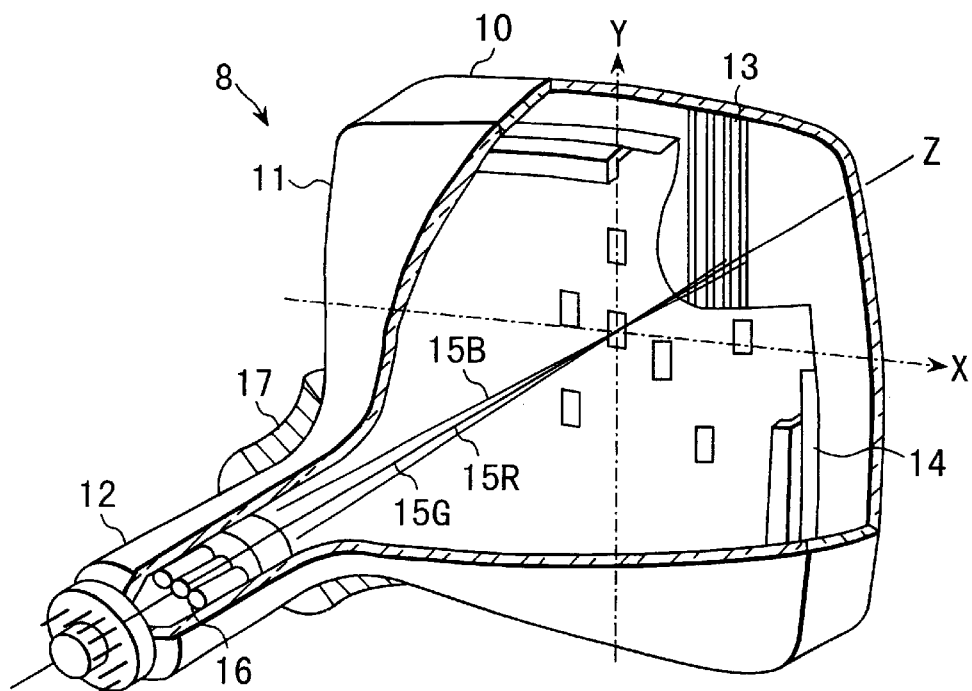
FIG. 1 is a partially cutaway perspective view showing one embodiment of the color cathode-ray tube according to the present invention.
Figure 2A:
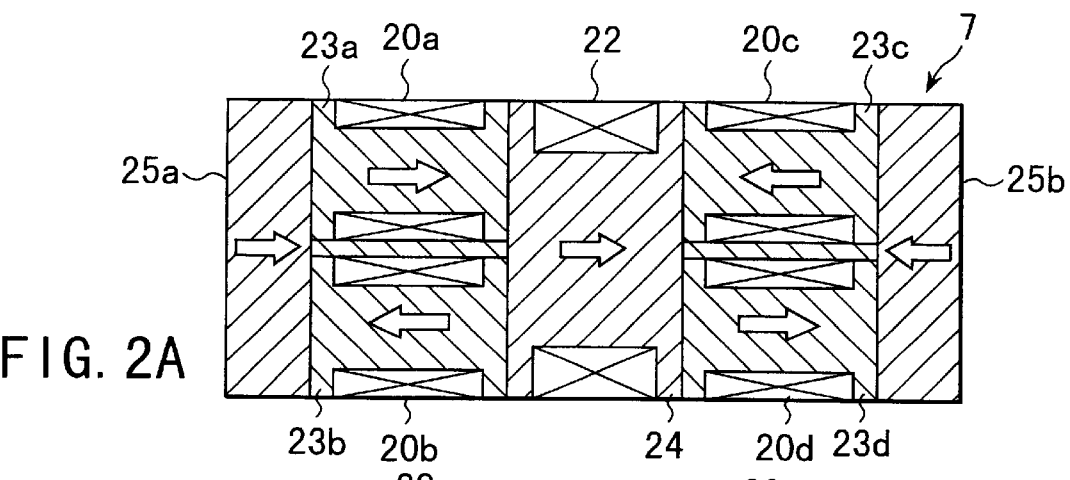
FIG. 2A is a sectional view showing the modulator of the color cathode-ray tube.
Figure 2B:
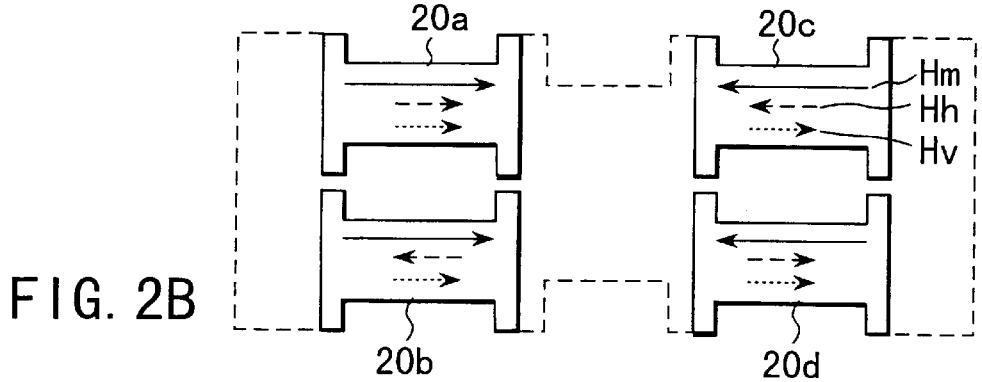
FIG. 2B is a schematic view showing the core of the modulator.
Figures 3A, 3B:
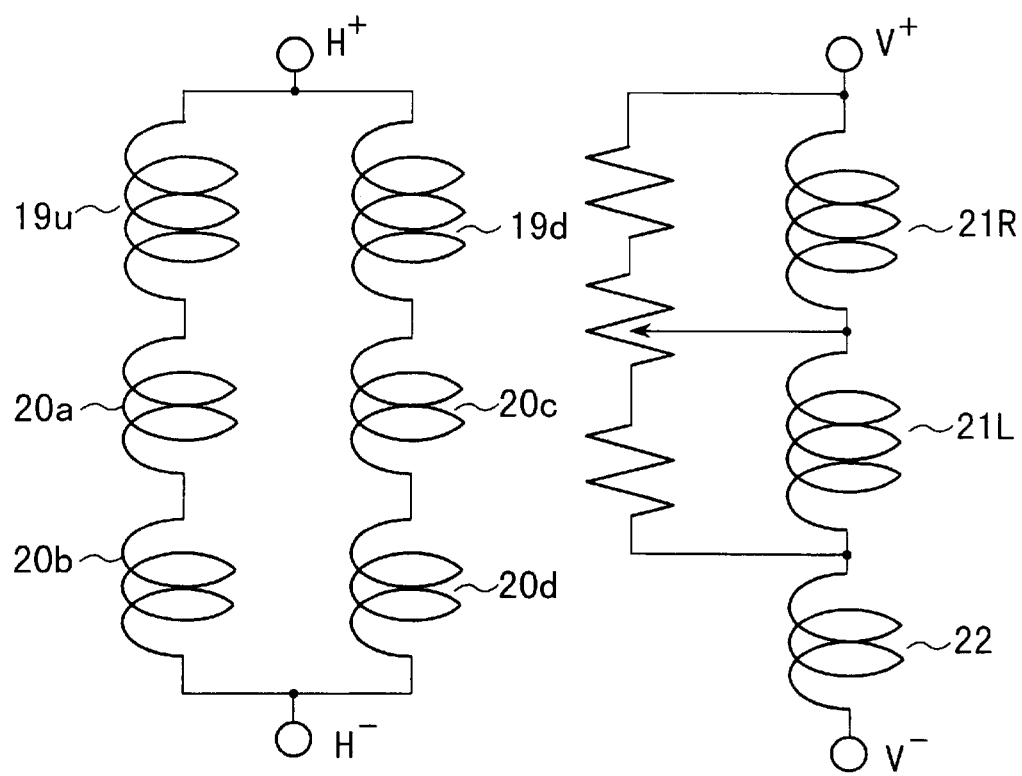
FIG. 3A is a view showing the connection structure of the saturated coil and the horizontal deflecting coil of the modulator.
FIG. 3B is a view showing the connection structure of the saturating coil and the vertical deflecting coil of the modulator.

As shown in FIG. 1, the color cathode-ray tube comprises a vacuum envelope 8, and this vacuum envelope has a substantially rectangular panel 10, a funnel fixed to the skirt portion of the panel, and a cylindrical neck 12. The panel 10 has a horizontal axis X and a vertical axis Y intersecting perpendicularly with each other, and on the inner surface of the panel 10 a phosphor screen 13 formed of three color phosphor layers emitting blue, green and red light is mounted. Further, in the vacuum envelope 8 a shadow mask opposed to the phosphor screen 13 is disposed.

On the other hand, in the neck 12 an electron gun 16 is arranged, and this electron gun emits three aligned electron beams 15B 15G and 15R consisting of a center beam 15 and a pair of side beams 15B, 15R passing on the same horizontal plane. Further, a deflecting yoke 17 is mounted from the reduced-diameter portion of the funnel 11 to the circumferential surface of the neck 12.

The deflecting yoke 17 has horizontal deflecting coils generating a magnetic field deflecting the three electron beams 15B, 15G and 15R emitted from the electron gun 16 in the horizontal direction (X-axis direction) and vertical deflecting coils generating a magnetic field deflecting the three electron beams 15B, 15G and 15R discharged from the electron gun 16 in the vertical direction (Y-axis direction). The horizontal deflecting coils are connected to a horizontal deflecting circuit driving not shown, and the vertical deflecting coils are connected to the vertical deflecting circuit driving not shown.

Further, as described later, a modulator or a distortion compensating element compensating different picture distortions such as inner kissen distortions in the intermediate portion and in the peripheral portions of the displayed picture is attached to the deflecting yoke 17. By this modulator or distortion compensating element, distortions such as inner kissen distortions which are different in the intermediate portion and the peripheral portions of the picture and have been conventionally difficult to be compensated can be compensated sufficiently, and a remarkable effect can be obtained in applying to wide deflection angle color cathode-ray tube apparatus and flat screen color cathode-ray tube apparatus in which such distortions are in particular noticeable.

Next, the modulator will be described in detail.

Conventionally, the modulator attached to the color cathode-ray tube apparatus is an element compensating for example the cross misconvergence of an in-line type color cathode-ray tube apparatus by unsymmetrizing the horizontal deflecting magnetic field vertically corresponding to the vertical deflecting current, and is disclosed in Jpn. Pat. Appln. KOKOKU Publication No. 52-3449, Jpn. Pat. Appln. KOKOKU Publication No. 52-33451, Jpn. Pat. Appln. KOKAI Publication No. 57-206184, Jpn. Pat. Appln. KOKOKU Publication No. 1-29018, Jpn. Pat. Appln. KOKOKU Publication No. 2-12429, Jpn. Hyb. Pat. Appln. KOKOKU Publication No. 1-39383, Jpn. Hyb. Pat. Appln. KOKOKU Publication No. 3-11800, Jpn. Hyb. Pat. Appln. KOKAI Publication No. 2-86237, "High Precision Deflection Yoke of SPM(S1 it wounded Precision deflection yoke with Magnetic current modulation) type: National Technical Report No. 2, Apl. 1985) or others.

As shown in FIGS. 2A, 2B, 3A and 3B, the modulator 7 comprises a pair of saturated coils 20a, 20b and a pair of saturated coils 20c, 20d connected in series to a pair of upper and lower horizontal deflecting coils 19u, 19d respectively; a saturating control coil 22 connected to a pair of left and right vertical deflecting coils 21R, 21L; two pairs of two saturable cores 23a to 23d around which the saturated coils 20a to 20d are wound respectively; a core 24 around which the saturating control coil 22 is wound and which is disposed between the saturable core 23a, 23b and the saturable core 23c, 23d; and magnets 25a, 25b disposed outside the saturable core 23a, 23b and outside the saturable core 23c, 23d respectively and biasing the saturable core 23a to 23d and the core 24 magnetically. The saturated control coil 20a, 20b and the saturated control coil 20c, 20d are wound so that they have opposite polarities to each other, and the influence of the magnetic field Hh of the saturated control coil 20a to 20d exerted in case of left and right deflection. Further, the core 24 around which the saturating control coil is wound may be omitted.

Figure 4A:
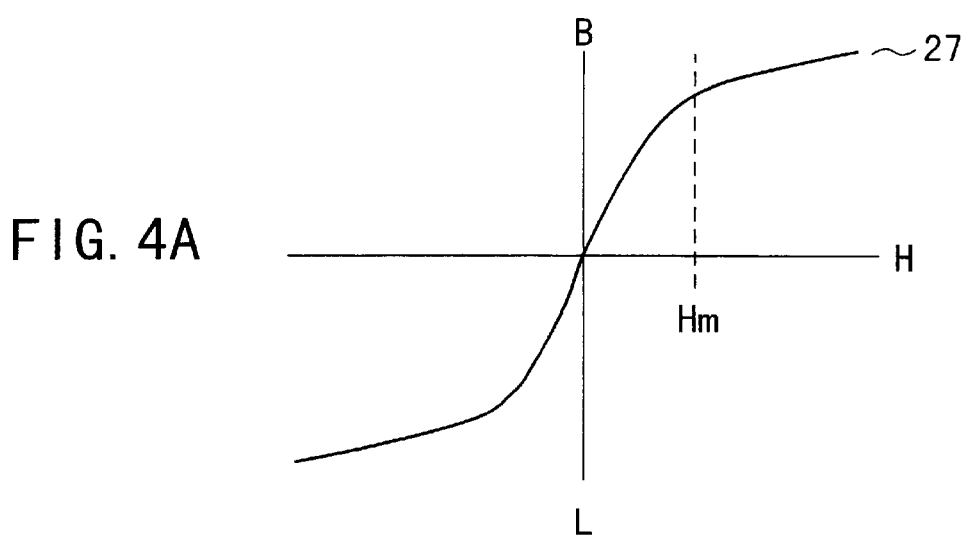
FIG. 4A is a graph showing the relation of the magnetic flux density B and the intensity of magnetic field H of the modulator.
Figure 4B:
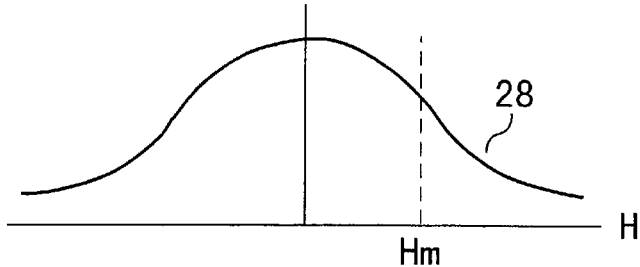
FIG. 4B is a graph showing the relation of the inductance L and the intensity of magnetic field H of the modulator.
Figure 5:
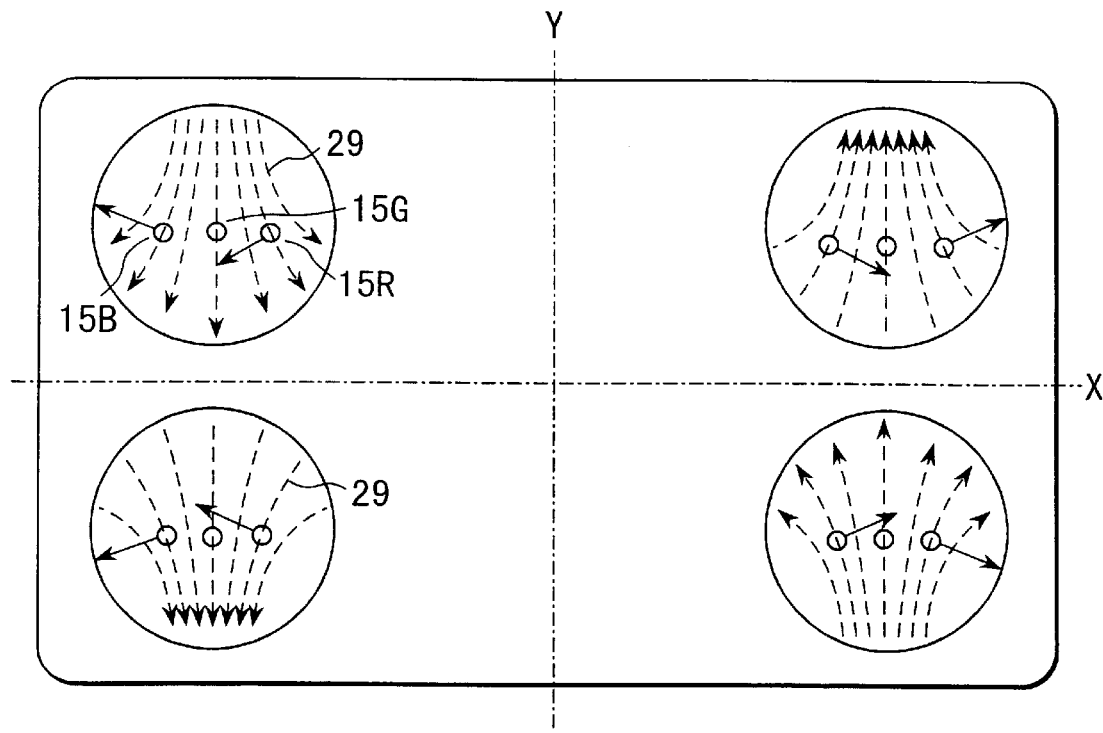
FIG. 5 a view illustrating the convergence correction by means of the modulator.

In such a modulator 7, as shown in FIG. 4A, the saturable cores 23a to 23d have B-H characteristics shown by the curve 27, wherein B means the magnetic flux density, and H means the intensity of magnetic field. Moreover, as shown in FIG. 4B, the saturated coils 20a to 20d have L-H characteristics shown by the curve 28, wherein L means the inductance. The inductance L of each saturated control coil 20a to 20d at the center of the phosphor screen 13 is set to about one half of the inductance L of the outer field zero hour due to the magnetic field Hm generated by means of the magnets 25a, 25b. Further, in case of vertical deflection, the inductance of the saturated coils 20a, 20b and the inductance of the saturated coils 20c, 20d change differentially due to the magnetic field Hv generated by means of the saturating control coil 22. As a result thereof, as shown in FIG. 5, a vertically unsymmetrical horizontal deflecting magnetic field 29 is generated, and the convergence of the three electron beams 15B, 15G and 15R is regulated properly.

According to this embodiment, in the modulator 7, by taking it into consideration that the increase in inductance in the horizontal deflecting circuit caused by the saturated coils 20a to 20d, or the increase in inductance in the vertical deflecting circuit caused by the saturating control coil 22 depends on the sum of the saturation conditions of the saturable cores 23a to 23d, not only the amount of the magnetic bias at the point at which the inductance of the saturated coils 20a to 20d is decreased to about one half is set to an extremely high or low value, but also the range of the magnetic field of the saturating control coil 22 or the saturated coils 20a to 20d is set properly.

Figure 6A:
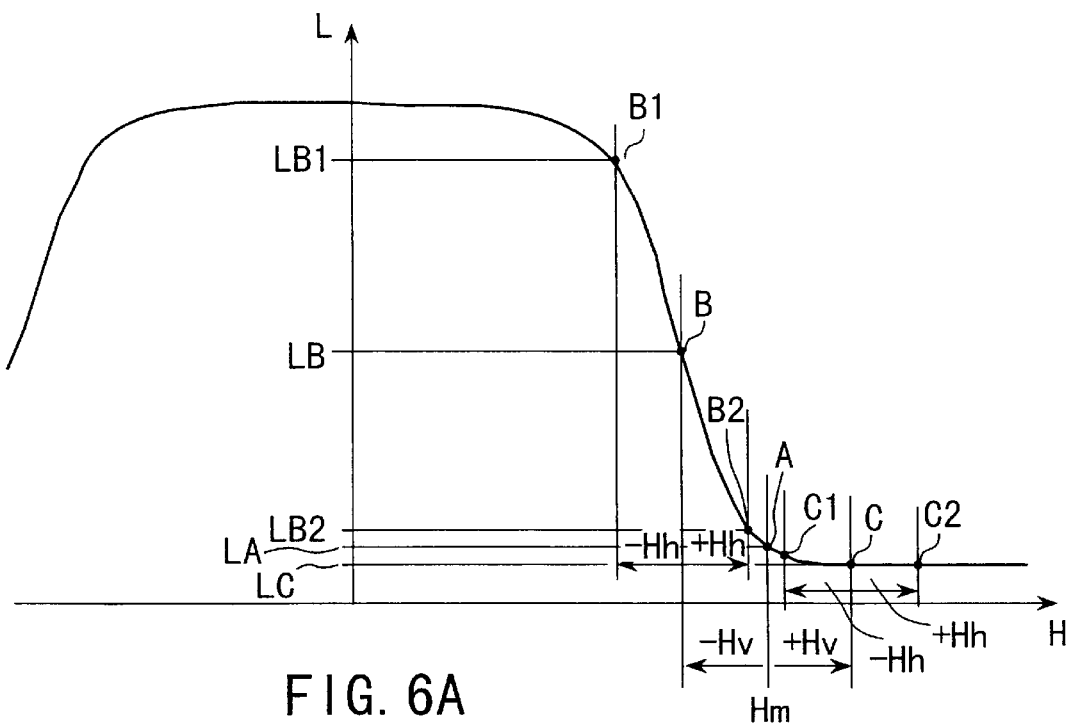
FIG. 6A is a graph showing the relation of the magnetic condition of each saturable core of the modulator in the upper and lower peripheral portions of the picture.
Figure 6B:
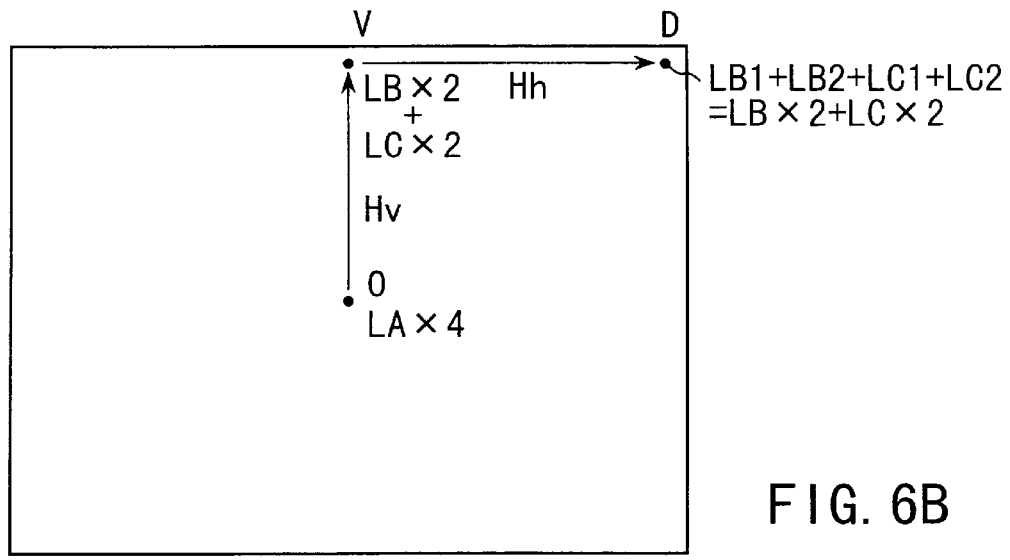
FIG. 6B is a graph showing the inductance of the coils which are wound around each saturable core on the picture.

As shown in FIG. 6A, the settings are made so that the point of the magnetic bias will correspond to the point of the saturation condition A by intensifying the magnets 25a, 25b of the modulator 7, and so that the saturable cores 23c, 23d on the side on which the magnetic bias is decreased due to the magnetic field Hv generated by means of the saturating control coil 22 at the lower end of the picture will correspond to the point of the half saturation condition B. At this time, as shown in FIG. 6B, at the point O at the center of the picture, the inductance of the coils 20a to 20d wound around the saturable cores 23a to 23d corresponds to an inductance of the saturation condition LA determined only by the magnetic field Hm generated by the magnets 25a, 25b, and further, at the points V at the upper and lower ends of the picture, the inductance of the coils 20c, 20d wound around the saturable cores 23c, 23d corresponds to an inductance of the half saturation condition LB, and the inductance of the coils 20a, 20b wound around the saturable cores 23a, 23b corresponds to an inductance of the extreme saturation condition LC. When observing the change of the inductance of the saturable cores 23a to 23d after they have been shifted from the points V at the upper and lower ends of the picture to the points D at the diagonal ends of the picture by the horizontal deflection, the saturable cores 23c, 23d in a half saturation condition are changed to the points B1, B2 respectively due to the magnetic field Hh generated at the left and right ends of the picture by the saturated coils, however, since the points B are in a half saturation condition, the sum of LB1 and LB2 is twice as much as LB, and there is no change of inductance due to the magnetic field Hh. Similarly, the saturable cores 23a, 23b in an extreme saturation condition show little change of inductance due to the magnetic field Hh, and consequently there is no change of inductance on the lines extending from the points V to the points D.

Figure 7A:
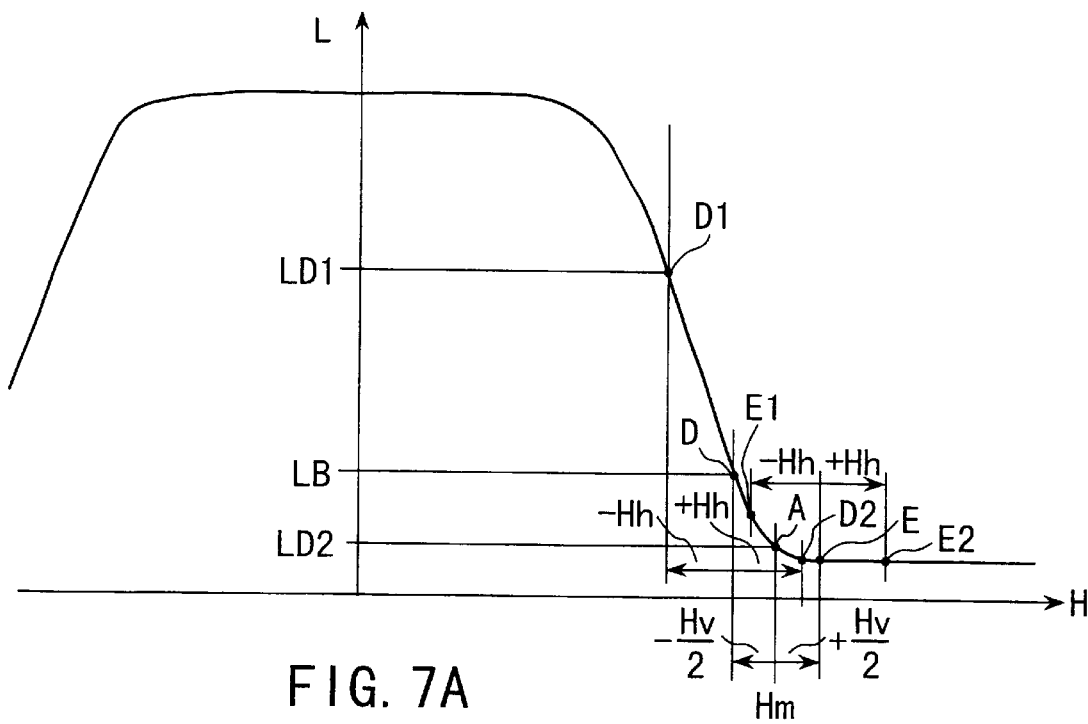
FIG. 7A is a graph showing the magnetic conditions of each saturable core of the modulator in the vertically intermediate portion of the picture.
Figure 7B:
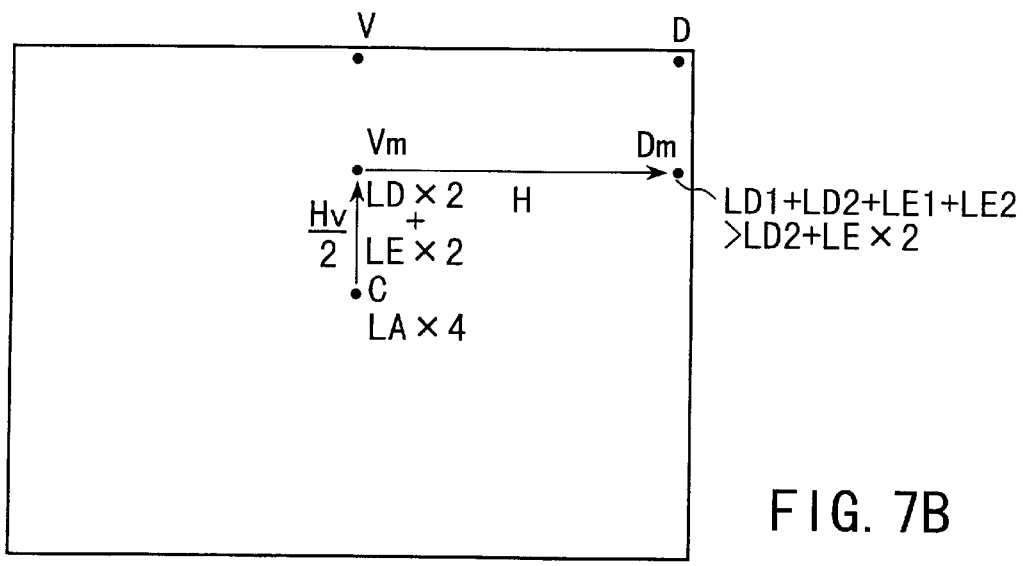
FIG. 7B is a graph showing the inductance of the coils which are wound around each saturable core in the vertically intermediate portion of the picture.

However, in these settings, as shown in FIGS. 7A, 7B, at the point Vm in the vertically intermediate portion of the picture, since the saturable cores 23c, 23d on the side on which the magnetic bias is decreased due to the magnetic field Hv/2 generated by the saturating control coil 22 still lie on the point of saturation D of the L-H curve in FIG. 7B, at the point Dm shifted further from this point Vm by the horizontal deflection, the increase in LD1 from LD exceeds the decrease in LD2 from LD, and consequently the inductance at the point Dm is larger than the inductance at the point Vm.

At this time, the inductance of the saturating control coil 22 changes almost in proportion to the sum of the inductance of the coils wound around the saturable cores 23a to 23d. This is because the saturating control coil 22 is a coil having the saturable cores 23a to 23d as magnetic cores, and because the inductance thereof is proportional to the change of the magnetic permeability of the magnetic cores.

Thus, in the design of the modulator 7, the inductance in the vertical deflecting circuit is increased and the vertical amplitude thereof is decreased towards the left and right ends of the picture at the vertically intermediate portion of the picture, and a barrel-shaped distortion correction is made. And therefore, at the upper and lower peripheral portions of the picture, the change of inductance in the vertical deflecting circuit is decreased to zero towards the left and right ends of the picture, and no distortion correction is necessary. As a result thereof, an inner kissen distortion at the intermediate portion of the picture as shown in FIG. 8 can be corrected.

Further, since the vertical deflection is a low-frequency deflection, the change of the vertical deflection amplitude is insensitive to the change of the inductance. However, since the inductance of the saturating control coil 22 has a magnitude and variable quantities of about 1 to 3 mH against the inductance of the overall vertical deflection of 5 to 6 mH, a distortion correction of about several millimeters can be made easily.

Further, since the inductance in the horizontal deflecting circuit changes similarly, correction effects can be exerted also on an inner kissen distortion at the horizontally intermediate portion of the picture. In this case, the settings are made so that the point biased magnetically by means of the magnets will correspond to a saturation condition, and so that the saturable cores on the side on which the magnetic bias is decreased due to the magnetic field Hh generated by means of the saturated coil at the left and right ends of the picture will be in a half saturation condition.

Figure 8:
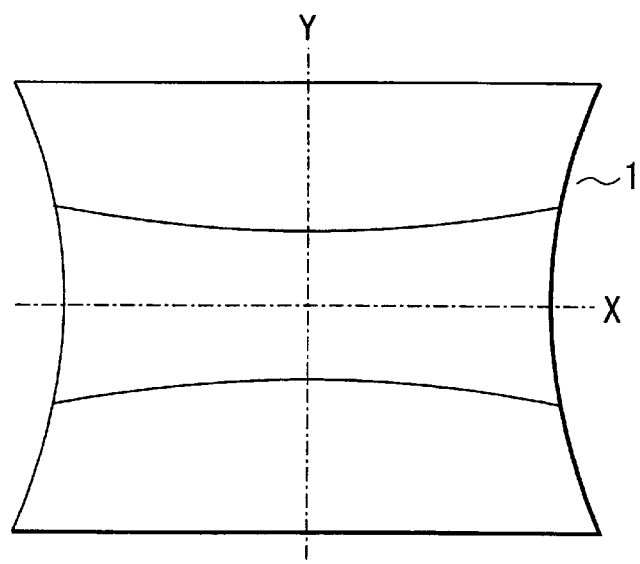
FIG. 8 is a view illustrating an inner kissen distortion generated on the picture.

Still further, by applying the above-described effect and by making the settings inversely so that the magnetic bias generated by means of the magnet will correspond to a non-saturation condition, and so that the saturable cores on the side on which the magnetic bias is intensified due to the magnetic field Hv of the saturating coil will be in a half saturation condition, an inner kissen distortion having a barrel shape at the vertically intermediate portion of the picture which is inverse to the distortion shown in FIG. 8 can be corrected.

Figure 10:
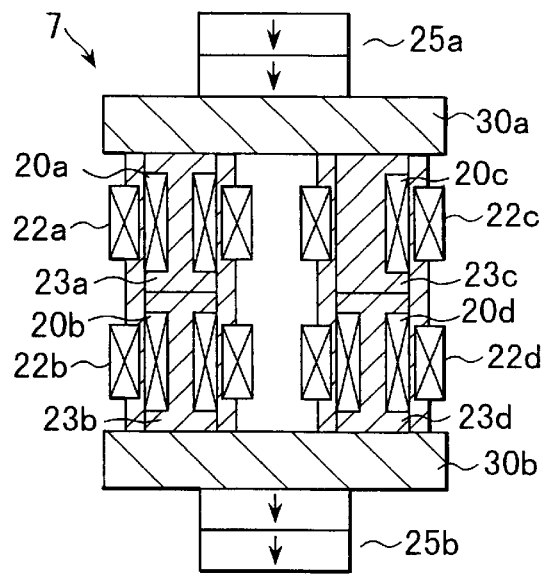
FIG. 10 is a sectional view showing the construction of the modulator of the color cathode-ray tube apparatus according to another embodiment of the present invention.

FIG. 10 shows a modulator 7 according to another embodiment of the present invention. This modulator 7 comprises two pairs of saturated coils 20a, 20b and 20c, 20d connected in series to a pair of upper and lower horizontal deflecting coils 19u, 19d (See FIG. 3A) respectively; four saturating control coils 22a to 22d connected in series to the vertical deflecting coils; two pairs of two saturable cores 23a to 23d around which the saturated coils 20a to 20d are wound respectively; ferrite cores 30a, 30b disposed at the outer ends of these saturable cores respectively; and magnets 25a, 25b disposed outside these ferrite cores and biasing the saturable cores 23a to 23d magnetically in an arrow direction.

In this modulator 7, a closed magnetic circuit includes the saturable cores 23a to 23d and the ferrite cores 30a, 30b, and further, the saturated coils 20a to 20d and the saturating control coils 22a to 22d are wound around the same saturable cores 23a to 23d respectively so that the saturated coils 20a to 20d are disposed inside and the saturating control coils 22a to 22d are disposed outside.

More concretely, with respect to the closed magnetic circuit having the four saturable cores 23a to 23d and the ferrite cores 30a, 30b, the series-connected saturating control coils 22a to 22d are wound 40 times respectively around the polarities intensifying the magnetomotive force each other, and the saturared control coils 20a to 20d are wound 28 times respectively around the polarities compensating the magnetic field each other.

Figure 11:
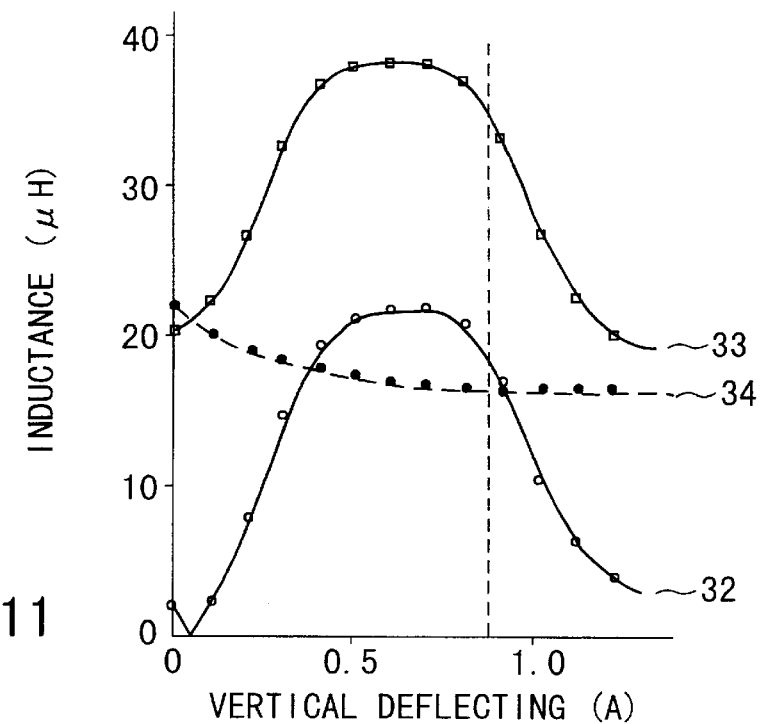
FIG. 11 is a graph showing the change of inductance with respect to the vertical deflecting current of the saturated coils of the modulator shown in FIG. 10.

FIG. 11 shows the relation between the vertical deflecting current and the inductance of the coils in the modulator 7 having the above-described composition. In the figure, the curve 33 shows a composite inductance of the saturated coils 20c, 20d with respect to the vertical deflecting current Iv, the curve 34 shows a composite inductance of the saturated coils 20c, 20d, and the curve 32 shows the difference between the composite inductance of the saturated coils 20a, 20b and the composite inductance of the saturated coils 20c, 20d respectively. As shown clearly in FIG. 11, the point of the magnetic point is in an extreme saturation condition. Further, the magnetic field generated by means of the saturating control coils 22a to 22d at the upper and lower ends of the picture is set to an extremely large value, the saturable cores on the side on which the magnetic bias is decreased due to the magnetic field Hv are in a non-saturation condition.

Usually, the four saturable cores 23a to 23d are biased magnetically to a point at which the inductance is decreased to about one half, and they compensate the influences each other by means of the magnetic field Hv of the saturating control coils 22a to 22d or the magnetic field Hh of the saturated coils 20a to 20d. Thus, there is no change of inductance in the horizontal/vertical deflecting circuit due to the vertical deflecting current or the horizontal deflecting current. However, as in this embodiment, when the saturable cores 23a to 23d are biased magnetically to an extreme saturation condition, the change of the inductance of the coils wound around the saturable cores having a polarity whose saturation is intensified by means of the magnetic field Hv or Hh is more than the change of the inductance of the coils wound around the saturable cores having a polarity whose saturation is weakened by means of the magnetic field Hv or Hh. Thus, with an increase in vertical deflecting current or horizontal deflecting current, the inductance in the horizontal/vertical deflecting circuit is increased. Further, by intensifying the magnetic field Hv of the saturating control coils, one of the upper and lower peripheral portions of the picture is in a non-saturation condition, and towards the left and right direction of the picture the inductance is decreased.

FIGS. 12A to 12E and FIGS. 13A to 13E show the results of the measurements of the inductance in the horizontal deflecting circuit across the phosphor screen along the vertical direction (Y-axis direction) and the horizontal direction (X-axis direction) by means of the curves 36a to 36e and the curves 37a to 37e respectively.

Figure 9:
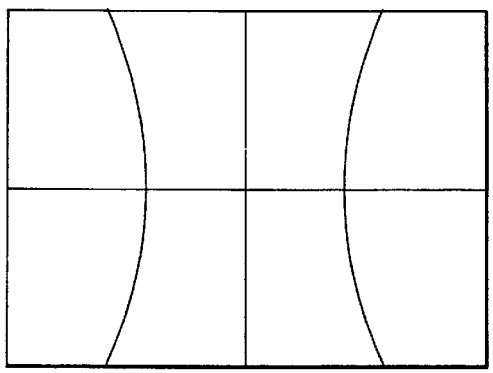
FIG. 9 is a view illustrating another inner kissen distortion on the picture.
Figure 12A:
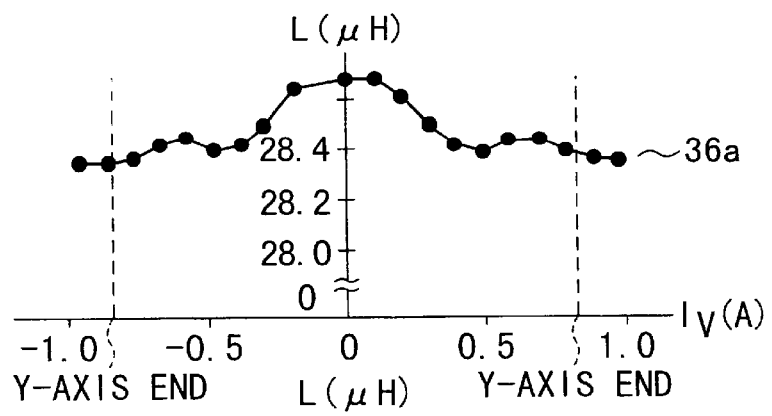
FIGS. 12A to 12E are graphs showing the change of inductance in the vertical deflecting circuit along the horizontal axis across the picture in case of disposing the modulator shown in FIG. 10 respectively.
Figure 12B:
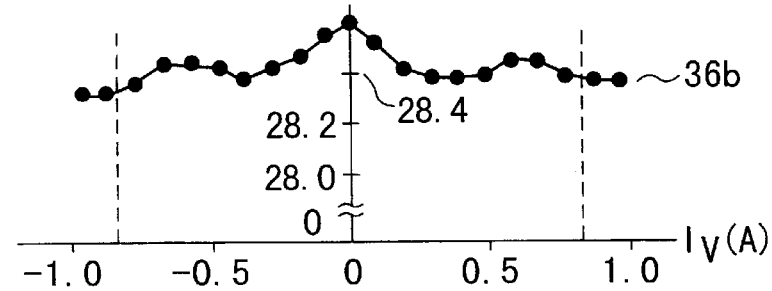
Figure 12C:
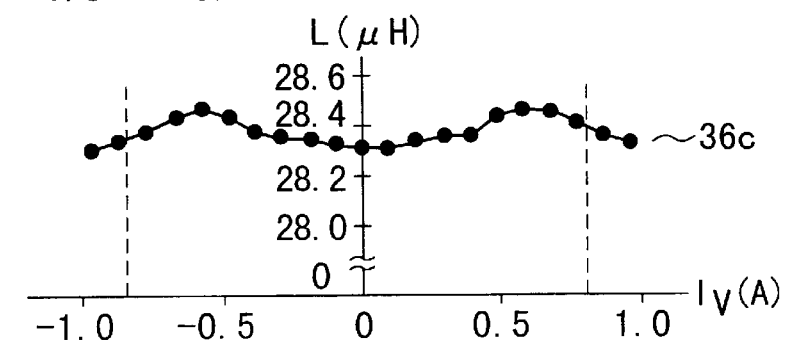
Figure 12D:
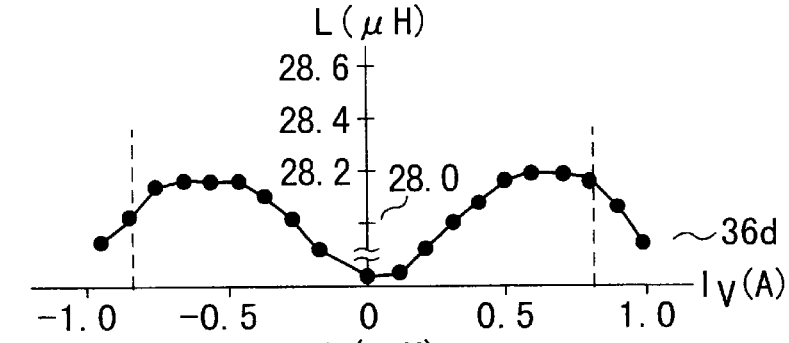
Figure 12E:
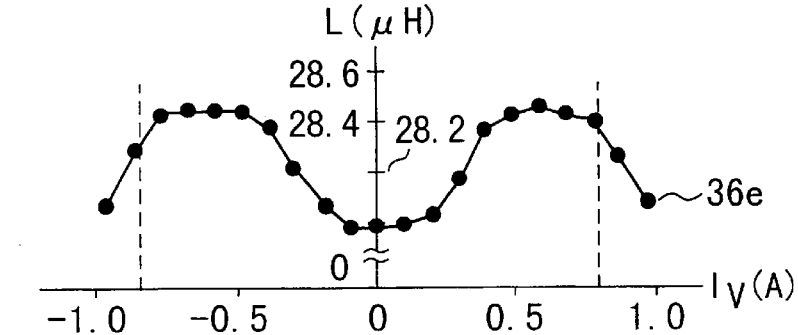

FIGS. 12A to 12E show the change of the inductance L of the saturated coils with respect to the vertical deflecting current Iv at a fixed horizontal coordinate (horizontal deflecting current), that is, the change of the inductance concerning the horizontal inner kissen distortion as shown in FIG. 9. FIG. 12A shows the change of the inductance L along the vertical direction at the end of the horizontal axis (horizontal deflecting current Ih=3.36 A), FIG. 12B shows the change of the inductance L in the vertical direction at the position by ¾ of the distance D from the center of the phosphor screen to the end of the horizontal axis away from the center of the phosphor screen (Ih=2.52 A), FIG. 12C shows the change of the inductance L in the vertical direction at the position by D/2 away from the center of the phosphor screen towards the end of the horizontal axis (Ih=1.68 A), FIG. 12D shows the change of the inductance L in the vertical direction at the position by D/4 away from the center of the phosphor screen towards the end of the horizontal axis (Ih=1.68 A), and FIG. 12E shows the change of the inductance L on the vertical axis Y (Ih=0 A) respectively.

FIGS. 13A to 13E show the change of the inductance L of the saturated coils with respect to the horizontal deflecting current Ih at a fixed vertical coordinate (vertical deflecting current). FIG. 13A shows the change of the inductance L along the horizontal direction at the end of the vertical axis (vertical deflecting current Iv=0.85 A), FIG. 13B shows the change of the inductance L in the horizontal direction at the position by ¾ of the distance F from the center of the phosphor screen to the end of the vertical axis away from the center of the phosphor screen (Iv=0.64 A), FIG. 13C shows the change of the inductance L along the horizontal direction at the position by F/2 away from the center of the phosphor screen towards the end of the vertical axis (Iv=0.43 A), FIG. 13D shows the change of the inductance L along the horizontal direction at the position by F/4 away from the center of the phosphor screen towards the end of the vertical axis (Iv=0.21 A), and FIG. 13E shows the change of the inductance L on the horizontal axis X (Ih=0 A) respectively. In this case, also the change of the inductance of the saturating control coil is substantially the same as the change of the inductance of the saturated coils, and this change corresponds to the change of the inductance L concerning the inner kissen distortion in the vertical direction as shown in FIG. 8.

Not only FIGS. 12A to 12E, but also FIGS. 13A to 13E show that the inductance L is increased with an increase in the deflecting currents Ih, Iv due to a strong magnetic bias in the vicinity of the center of the phosphor screen, and that the inductance L is uniform in the peripheral portions of the phosphor screen. The reason why the inductance L is uniform in the peripheral portions of the phosphor screen is that the one pair of the saturable cores is shifted to a half saturation condition in which the change of the inductance L is compensated each other, and the other pair of the saturable cores is shifted to a much higher saturation condition in which there is no change of the inductance L by the deflecting current Ih or Iv. Further, by contrast, when the deflecting current Ih or Iv is increased, as shown in FIG. 12A, the one pair of the saturable cores is in a weaker magnetic bias condition than at the conventional bias point, that is, in a half saturation condition, and therefore, the inductance L is decreased with an increase in the deflecting current.

Figure 14:
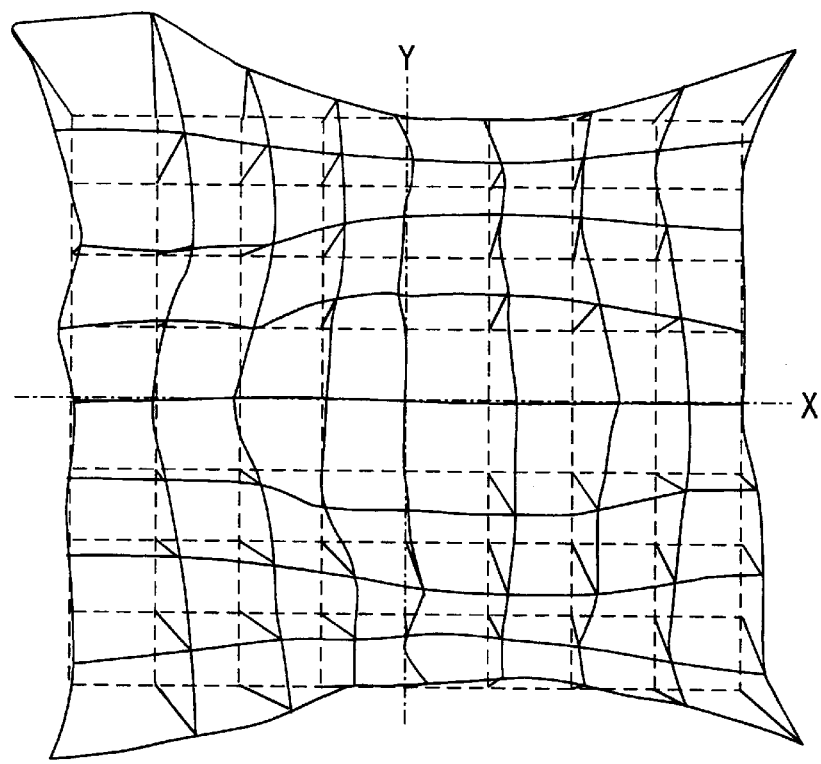
FIG. 14 is a view showing the change of distortion of the color cathode-ray tube apparatus in case of disposing the modulator shown in FIG. 10.

When the modulator 7 is used, as shown in FIG. 14, the distortion is changed into a barrel shape only in the central portion of the picture corresponding to the change of the inductance L, and in the peripheral portions of the picture the distortion is changed into a pin cushion shape.

Further, since the change of the inductance caused by means of the modulator is the same in the horizontal deflecting circuit and in the vertical deflecting circuit, basically, as shown in FIG. 14, the inner kissen distortion is also changed by compensating the inner kissen distortion in the vertical direction. When it is desired to correct the inner kissen distortion only in the vertical direction as shown in FIG. 8, by setting the inductance of the saturating control coil to an extremely high value with respect to the inductance of the vertical deflecting circuit and setting the inductance of the saturated coils to an extremely low value with respect to the inductance of the horizontal deflecting circuit, the inner kissen distortion in the horizontal direction can be reduced.

Further, by using a distortion compensating element comprising an inductance variable element having no convergence correcting function such as the modulator, the distortion can be corrected without changing the convergence.

Figure 15:
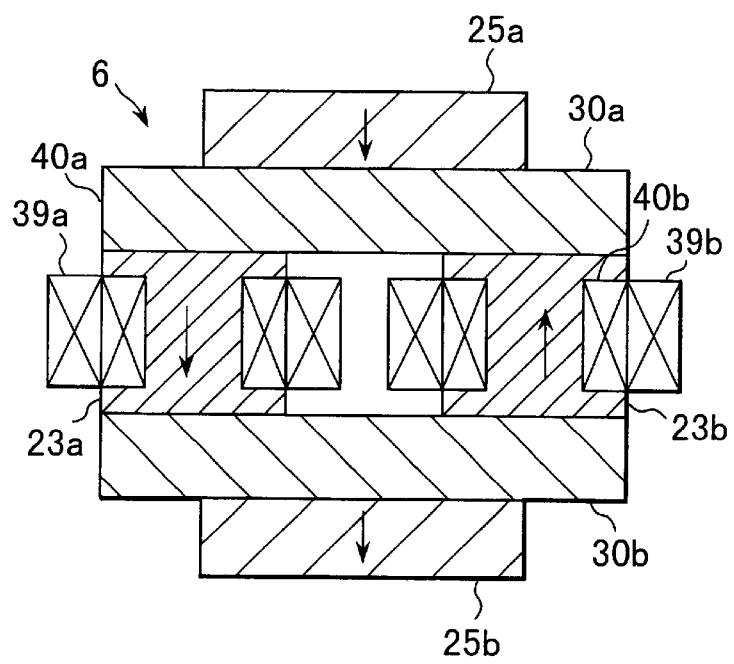
FIG. 15 is a sectional view showing the distortion correcting element of the color cathode-ray tube apparatus according to still another embodiment of the present invention.
Figure 16A:
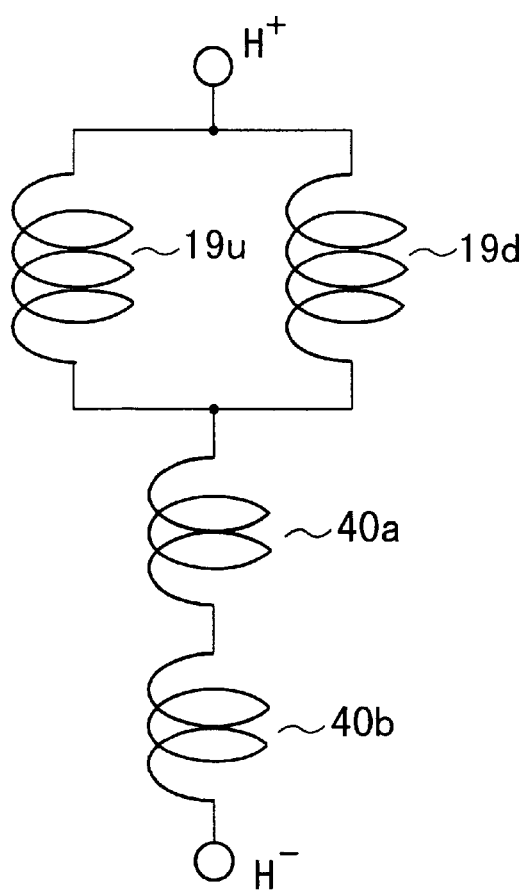
FIG. 16A is a view showing the connection structure of the horizontal correcting coil and the horizontal deflecting coil of the distortion correcting element.
Figure 16B:
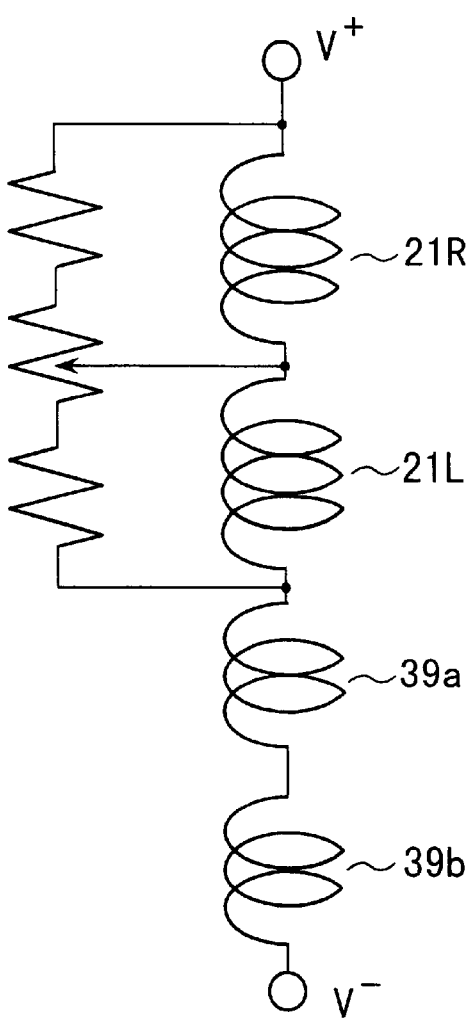
FIG. 16B is a view showing the connection structure of the vertical correcting coil and the vertical deflecting coil of the distortion element.

As shown in FIG. 15 and FIG. 16B, this distortion compensating element 6 has a closed magnetic circuit including a pair of saturable cores 23a, 23b and ferrite cores 30a, 30b disposed on the both ends of these saturable cores 23a, 23b. Around the saturable cores 23a, 23b two series-connected vertical auxiliary coils 39a, 39b having polarities intensifying the magnetomotive force each other and two series-connected horizontal auxiliary coils 40a, 40b having polarities weakening the magnetomotive force each other are wound respectively so that the horizontal auxiliary coils 40a, 40b are disposed inside and the vertical auxiliary coils 39a, 39b are disposed outside. Outside the ferrite cores 30a, 30b are arranged magnets 25a, 25b for biasing the saturable cores 23a, 23b magnetically in an arrow direction. The vertical auxiliary coils 39a, 39b are connected to a pair of left and right vertical deflecting coils 21R, 21L respectively, and the horizontal auxiliary coils 40a, 40b are connected to a pair of upper and lower horizontal deflecting coils 19u, 19d respectively.

Such a distortion correcting element 6 can correct distortions similarly to the modulator 7 by changing the inductance without changing the convergence. Therefore, the construction is simplified and a high degree of freedom of design can be obtained.

As described above, by intensifying or weakening the point of the magnetic bias extremely compared to the conventional modulators, and by disposing a modulator or a distortion compensating element in which the intensity of the magnetic field generated in the outer surface peripheral portions of the saturating coil or the vertical auxiliary coils as well as of the saturated coils and the horizontal auxiliary coils is set properly in the deflecting yoke of the cathode-ray tube apparatus, the difference of distortion in the intermediate portion and in the peripheral portions of the picture such as inner kissen distortion can be corrected effectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cathode-ray tube apparatus comprising:
    a vacuum envelope including a substantially rectangular panel having a phosphor screen on an inner surface thereof and having a horizontal and a vertical axis, a funnel fixed to the panel, and a neck connected to a reduced-diameter portion of the funnel;
    an electron gun arranged in the neck, for emitting electron beams towards the phosphor screen;
    a deflecting yoke mounted on the reduced-diameter portion of the funnel and on the circumference of the neck, for deflecting the electron beams so that the phosphor screen is scanned in the horizontal and vertical directions, the deflecting yoke having horizontal deflecting coils for deflecting the electron beams in the horizontal direction, and vertical deflecting coils for deflecting the electron beams in the vertical direction; and
    a modulator having saturated coils connected to the horizontal deflecting coils, a saturating control coils connected to the vertical deflecting coils, saturable cores around which the saturated coils or the saturating control coils are wound, and magnets biasing the saturable cores magnetically,
    wherein the modulator has different settings in an intermediate portion and in peripheral portions of a picture formed on the phosphor screen so that the change of inductance of the saturating control coils in the horizontal axis direction compensates the difference of North-South distortion between the intermediate portion and the peripheral portions of the picture with respect to the vertical axis direction.

2. A cathode-ray tube apparatus according to claim 1, wherein in the modulator, the point of the magnetic bias caused by means of the magnets corresponds to the saturation condition of the saturable cores, and one of the saturable cores is in a half saturation condition, and the other of the saturable cores is in an extreme saturation condition due to the magnetic field applied from the saturating control coils to the peripheral portions of the picture in the vertically axial direction, the inductance of the saturating control coil is increased in the intermediate portion of the picture in the vertically axial direction towards the both ends of the picture in the horizontally axial direction, and the change of the inductance of the saturating control coils is decreased to zero in the peripheral portions of the picture in the vertically axial direction towards the both ends of the picture in the horizontally axial direction, and the modulator corrects a barrel-shaped NS distortion in the vertically intermediate portion of the picture.

3. A cathode-ray tube apparatus according to claim 1, wherein in the modulator, the point of the magnetic bias caused by means of the magnets corresponds to the saturation condition of the saturable cores, and one of the saturable cores is in a half saturation condition, and the other of the saturable cores is in an extreme saturation condition due to the magnetic field applied from the saturating control coils to the peripheral portions of the picture in the vertically axial direction, the inductance of the saturating control coil is increased in the intermediate portion of the picture in the vertically axial direction towards the both ends of the picture in the horizontally axial direction, and the change of the inductance of the saturating control coils is decreased to zero in the peripheral portions of the picture in the vertically axial direction towards the both ends of the picture in the horizontally axial direction, and the modulator corrects a barrel-shaped NS distortion in the intermediate portion of the picture in the vertically axial direction and a pin cushion-shaped NS distortion in the peripheral portions of the picture in the vertically axial direction.

4. A cathode-ray tube apparatus according to claim 1, wherein in the modulator, the point of the magnetic bias caused by means of the magnets corresponds to the non-saturation condition of the saturable cores, and one of the saturable cores is in a half saturation condition, and the other of the saturable cores is in an extreme no-saturation condition due to the magnetic field applied form the saturating control coils to the peripheral portions of the picture in the vertically axial direction, the inductance of the saturating control coils is decreased in the intermediate portion of the picture in the vertically axial direction towards the both ends of the picture in the horizontally axial direction, and the change of the inductance of the saturating control coils is decreased to zero in the peripheral portions of the picture in the vertically axial direction towards the both ends of the picture in the horizontally axial direction, and the modulator corrects a pin cushion-shaped NS distortion in the intermediate portion of the picture in the vertically axial direction.

5. A cathode-ray tube apparatus according to claim 1, wherein in the modulator, the point of the magnetic bias caused by means of the magnets corresponds to the non-saturation condition of the saturable cores, and one of the saturable cores is in a half saturation condition, and the other of the saturable cores is in an extreme no-saturation condition due to the magnetic field applied from the saturating control coils to the peripheral portions of the picture in the vertically axial direction, the inductance of the saturating control coils is decreased in the intermediate portion of the picture in the vertically axial direction towards the both ends of the picture in the horizontally axial direction, and the change of the inductance of the saturating control coils is increased in the peripheral portions of the picture in the vertically axial direction towards the both ends of the picture in the horizontally axial direction, and the modulator corrects a pin cushion-shaped NS distortion in the intermediate portion of the picture in the vertically axial direction and a barrel-shaped NS distortion in the peripheral portions of the picture in the vertically axial direction.

6. A cathode-ray tube apparatus comprising:

a vacuum envelope including a substantially rectangular panel having a phosphor screen on an inner surface thereof and having a horizontal and a vertical axis, a funnel fixed to the panel, and a neck connected to a reduced-diameter portion of the funnel;

an electron gun arranged in the neck, for emitting electron beams towards the phosphor screen;

a deflecting yoke mounted on the reduced-diameter portion of the funnel and on the circumference of the neck, for deflecting the electron beams so that the phosphor screen is scanned in the horizontal and vertical directions, the deflecting yoke having horizontal deflecting coils for deflecting the electron beams in the horizontal direction, and vertical deflecting coils for deflecting the electron beams in the vertical direction; and a modulator having saturated coils connected to the horizontal deflecting coils, a saturating control coils connected to the vertical deflecting coils, saturable cores around which the saturated coils or the saturating control coils are wound, and magnets biasing the saturable cores magnetically, wherein the modulator has different settings in an intermediate portion and in peripheral portions of a picture formed on the phosphor screen so that the change of inductance of the saturated coils in the vertical axis direction compensates the difference of EW distortion between the intermediate portion and the peripheral portions of the picture with respect to the horizontal axis direction.

7. A cathode-ray tube apparatus according to claim 6, wherein in the modulator, the point of the magnetic bias caused by means of the magnets corresponds to the saturation condition of the saturable cores, and one of the saturable cores is in a half saturation condition, and the other of the saturable cores is in an extreme no-saturation condition due to the magnetic field applied from the saturated coils to the peripheral portions of the picture in the horizontally axial direction, the inductance of the saturated coils is increased in the intermediate portion of the picture in the horizontally axial direction towards the both ends of the picture in the vertically axial direction, and the change of the inductance of the saturated coils is decreased to zero in the peripheral portions of the picture in the horizontally axial direction towards the both ends of the picture in the vertically axial direction, and the modulator corrects a barrel-shaped East-West distortion in the intermediate portion of the picture in the horizontally axial direction.

8. A cathode-ray tube apparatus according to claim 6, wherein in the modulator, the point of the magnetic bias caused by means of the magnets corresponds to the saturation condition of the saturable cores, and one of the saturable cores is in a non-saturation condition, and the other of the saturable cores is in an extreme saturation condition due to the magnetic field applied from the saturated coils to the peripheral portions of the picture in the horizontally axial direction, the inductance of the saturated coils is increased in the intermediate portion of the picture in the horizontally axial direction towards the both ends of the picture in the vertically axial direction, and the change of the inductance of the saturated coils is decreased in the peripheral portions of the picture in the horizontally axial direction towards the both ends of the picture in the vertically axial direction, and the modulator corrects a barrel-shaped East-West distortion in the intermediate portion of the picture in the horizontally axial direction and a pin cushion-shaped EW distortion in the peripheral portions of the picture in the horizontally axial direction.

9. A cathode-ray tube apparatus according to claim 6, wherein in the modulator, the point of the magnetic bias caused by means of the magnets corresponds to the non-saturation condition of the saturable cores, and one of the saturable cores is in a half saturation condition, and the other of the saturable cores is in an extreme non-saturation condition due to the magnetic field applied from the saturated coils to the peripheral portions of the picture in the horizontally axial direction, the inductance of the saturated coils is decreased in the intermediate portion of the picture in the horizontally axial direction towards the both ends of the picture in the vertically axial direction, and the change of the inductance of the saturated coils is decreased to zero in the peripheral portions of the picture in the horizontally axial direction towards the both ends of the picture in the vertically axial direction, and the modulator corrects a pin cushion-shaped EW distortion in the intermediate portion of the picture in the horizontally axial direction.

10. A cathode-ray tube apparatus according to claim 6, wherein in the modulator, the point of the magnetic bias caused by means of the magnets corresponds to the non-saturation condition of the saturable cores, and one of the saturable cores is in a saturation condition, and the other of the saturable cores is in an extreme non-saturation condition due to the magnetic field applied from the saturated coils to the peripheral portions of the picture in the horizontally axial direction, the inductance of the saturated coils is decreased in the intermediate portion of the picture in the horizontally axial direction towards the both ends of the picture in the vertically axial direction, and the change of the inductance of the saturated coils is increased in the peripheral portions of the picture in the horizontally axial direction towards the both ends of the picture in the vertically axial direction, and the modulator corrects a pin cushion-shaped East-West distortion in the intermediate portion of the picture in the horizontally axial direction and a barrel-shaped EW distortion in the peripheral portions of the picture in the horizontally axial direction.

11. A cathode-ray tube apparatus comprising:
a vacuum envelope including a substantially rectangular panel having a phosphor screen on the inner surface thereof and also having a horizontal and a vertical axis, a funnel fixed to the panel and a neck connected to a reduced-diameter portion of the funnel; an electron gun arranged in the neck, for emitting electron beams towards the phosphor screen;
a deflecting yoke mounted on the reduced-diameter portion of the funnel and on the circumference of the neck, for deflecting the electron beams so that the phosphor screen is scanned in the horizontal and vertical directions, the deflecting yoke having horizontal deflecting coils for deflecting the electron beams in the horizontal direction, and vertical deflecting coils for deflecting the electron beams in the vertical direction; and
a distortion compensating element having horizontal auxiliary coils connected to the horizontal deflecting coils, vertical auxiliary coils connected to the vertical deflecting coils, saturable cores around which the horizontal or vertical auxiliary coils are wound, and magnets biasing the saturable cores magnetically, wherein the distortion compensating element has different settings in an intermediate portion and in peripheral portions of a picture formed on the phosphor screen so that the change of inductance of the horizontal auxiliary coils in the horizontal axis direction compensates the difference of NS distortion between the intermediate portion and the peripheral portions of the picture with respect to the vertical axis direction.

12. A cathode-ray tube apparatus according to claim 11, wherein, in the distortion compensating element, the point of the magnetic bias caused by means of the magnets corresponds to the saturation condition of the saturable cores, and one of the saturable cores is in a half saturation condition, and the other of the saturable cores is in an extreme saturation condition due to the magnetic field applied from the vertical auxiliary coils to the peripheral portions of the picture in the vertically axial direction, the inductance of the vertical auxiliary coils is increased in the intermediate portion of the picture in the vertically axial direction towards the both ends of the picture in the horizontally axial direction, and the change of the inductance of the vertical auxiliary coils is decreased to zero in the peripheral portions of the picture in the vertically axial direction towards the both ends of the picture in the horizontally axial direction, and the distortion compensating element corrects a barrel-shaped NS distortion in the vertically intermediate portion of the picture.

13. A cathode-ray tube apparatus according to claim 11, wherein in the distortion compensating element, the point of the magnetic bias caused by means of the magnets corresponds to the saturation condition of the saturable cores, and one of the saturable cores is in a half saturation condition, and the other of the saturable cores is in an extreme saturation condition due to the magnetic field applied from the vertical auxiliary coils to the peripheral portions of the picture in the vertically axial direction, the inductance of the vertical auxiliary coils is increased in the intermediate portion of the picture in the vertically axial direction towards the both ends of the picture in the horizontally axial direction, and the change of the inductance of the vertical auxiliary coils is decreased to zero in the peripheral portions of the picture in the vertically axial direction towards the both ends of the picture in the horizontally axial direction, and the distortion compensating element corrects a barrel-shaped NS distortion in the intermediate portion of the picture in the vertically axial direction and a pin cushion-shaped North-South distortion in the peripheral portions of the picture in the vertically axial direction.

14. A cathode-ray tube apparatus according to claim 11, wherein in the distortion compensating element, the point of the magnetic bias caused by means of the magnets corresponds to the non-saturation condition of the saturable cores, and one of the saturable cores is in a half saturation condition, and the other of the saturable cores is in an extreme no-saturation condition due to the magnetic field applied from the vertical auxiliary coils to the peripheral portions of the picture in the vertically axial direction, the inductance of the vertical auxiliary coils is decreased in the intermediate portion of the picture in the vertically axial direction towards the both ends of the picture in the horizontally axial direction, and the change of the inductance of the vertical auxiliary coils is decreased to zero in the peripheral portions of the picture in the vertically axial direction towards the both ends of the picture in the horizontally axial direction, and the distortion compensating element corrects a pin cushion-shaped NS distortion in the peripheral portions of the picture in the vertically axial direction.

15. A cathode-ray tube apparatus according to claim 11, wherein in the distortion compensating element, the point of the magnetic bias caused by means of the magnets corresponds to the non-saturation condition of the saturable cores, and one of the saturable cores is in a saturation condition, and the other of the saturable cores is in an extreme non-saturation condition due to the magnetic field applied from the vertical auxiliary coils to the peripheral portions of the picture in the vertically axial direction, the inductance of the vertical auxiliary coils is decreased in the intermediate portion of the picture in the vertically axial direction towards the both ends of the picture in the horizontally axial direction, and the change of the inductance of the vertical auxiliary coils is increased in the peripheral portions of the picture in the vertically axial direction towards the both ends of the picture in the horizontally axial direction, and the distortion compensating element corrects a pin cushion-shaped NS distortion in the intermediate portion of the picture in the vertically axial direction and a barrel-shaped NS distortion in the peripheral portions of the picture in the vertically axial direction.

16. A cathode-ray tube apparatus comprising:
a vacuum envelope including a substantially rectangular panel having a phosphor screen on the inner surface thereof and also having a horizontal and a vertical axis, a funnel fixed to the panel and a neck connected to a reduced-diameter portion of the funnel; an electron gun arranged in the neck, for emitting electron beams towards the phosphor screen;
a deflecting yoke mounted on the reduced-diameter portion of the funnel and on the circumference of the neck, for deflecting the electron beams so that the phosphor screen is scanned in the horizontal and vertical directions, the deflecting yoke having horizontal deflecting coils for deflecting the electron beams in the horizontal direction, and vertical deflecting coils for deflecting the electron beams in the vertical direction; and
a distortion compensating element having horizontal auxiliary coils connected to the horizontal deflecting coils, vertical auxiliary coils connected to the vertical deflecting coils, saturable cores around which the horizontal or vertical auxiliary coils are wound, and magnets biasing the saturable cores magnetically,
wherein the distortion compensating element has different settings in an intermediate portion and in peripheral portions of a picture formed on the phosphor screen so that the change of inductance of the vertical auxiliary coils in the vertical axis direction compensates the difference of East-West distortion between the intermediate portion and the peripheral portions of the picture with respect to the horizontal axis direction.

17. A cathode-ray tube apparatus according to claim 16, wherein in the distortion compensating element, the point of the magnetic bias caused by means of the magnets corresponds to the saturation condition of the saturable cores, and one pair of the saturable cores is in a half saturation condition, and the other of the saturable cores is in an extreme no-saturation condition due to the magnetic field applied from the vertical auxiliary coils to the peripheral portions of the picture in the horizontally axial direction, the inductance of the vertical auxiliary coils is increased in the intermediate portion of the picture in the horizontally axial direction towards the both ends of the picture in the vertically axial direction, and the change of the inductance of the vertical auxiliary coils is decreased to zero in the peripheral portions of the picture in the horizontally axial direction towards the both ends of the picture in the vertically axial direction, and therefore, the distortion compensating element corrects a barrel-shaped EW distortion in the intermediate portion of the picture in the horizontally axial direction.

18. A cathode-ray tube apparatus according to claim 16, wherein in the distortion compensating element, the point of the magnetic bias caused by means of the magnets corresponds to the saturation condition of the saturable cores, and one of the saturable cores is in a non-saturation condition, and the other of the saturable cores is in an extreme saturation condition due to the magnetic field applied from the vertical auxiliary coils to the peripheral portions of the picture in the horizontally axial direction, the inductance of the vertical auxiliary coils is increased in the intermediate portion of the picture in the horizontally axial direction towards the both ends of the picture in the vertically axial direction, and the change of the inductance of the vertical auxiliary coils is decreased in the peripheral portions of the picture in the horizontally axial direction towards the both ends of the picture in the vertically axial direction, and the distortion compensating element corrects a barrel-shaped East-West distortion in the intermediate portion of the picture in the horizontally axial direction and a pin cushion-shaped EW distortion in the peripheral portions of the picture in the horizontally axial direction.

19. A cathode-ray tube apparatus according to claim 16, wherein in the distortion compensating element, the point of the magnetic bias caused by means of the magnets corresponds to the non-saturation condition of the saturable cores, and one of the saturable cores is in a half saturation condition, and the other of the saturable cores is in an extreme non-saturation condition due to the magnetic field applied from the vertical auxiliary coils to the peripheral portions of the picture in the horizontally axial direction, the inductance of the vertical auxiliary coils is decreased in the intermediate portion of the picture in the horizontally axial direction towards the both ends of the picture in the vertically axial direction, and the change of the inductance of the vertical auxiliary coils is decreased to zero in the peripheral portions of the picture in the horizontally axial direction towards the both ends of the picture in the vertically axial direction, and the distortion compensating element modulator corrects a pin cushion-shaped EW distortion in the peripheral portions of the picture in the horizontally axial direction.

20. A cathode-ray tube apparatus according to claim 16, wherein in the distortion compensating element, the point of the magnetic bias caused by means of the magnets corresponds to the non-saturation condition of the saturable cores, and one of the saturable cores is in a half saturation condition, and the other of the saturable cores is in an extreme saturation condition due to the magnetic field applied from the vertical auxiliary coils to the peripheral portions of the picture in the horizontally axial direction, the inductance of the vertical auxiliary coils is decreased in the intermediate portion of the picture in the horizontally axial direction towards the both ends of the picture in the vertically axial direction, and the change of the inductance of the vertical auxiliary coils is increased in the peripheral portions of the picture in the horizontally axial direction towards the both ends of the picture in the vertically axial direction, and therefore, the distortion compensating element corrects a pin cushion-shaped EW distortion in the intermediate portion of the picture in the horizontally axial direction and a barrel-shaped EW distortion in the peripheral portions of the picture in the horizontally axial direction.

* * * * *